E. CHAMBERLIN.
Whip-Socket.
No. 222,867.  Patented Dec. 23, 1879.
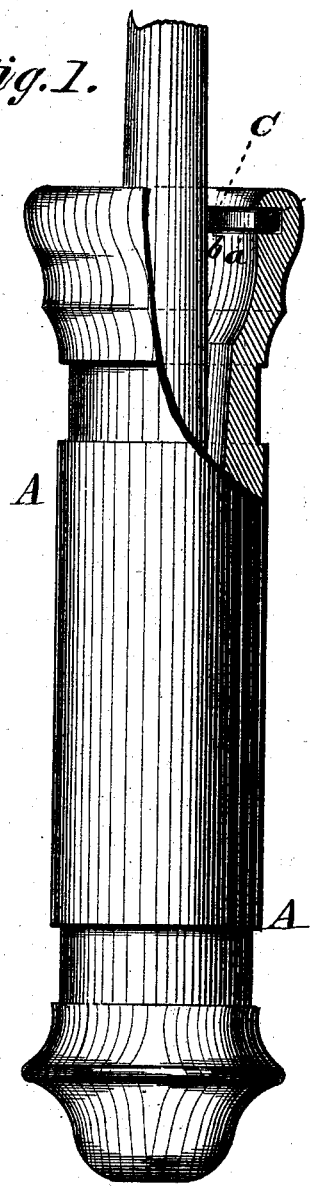
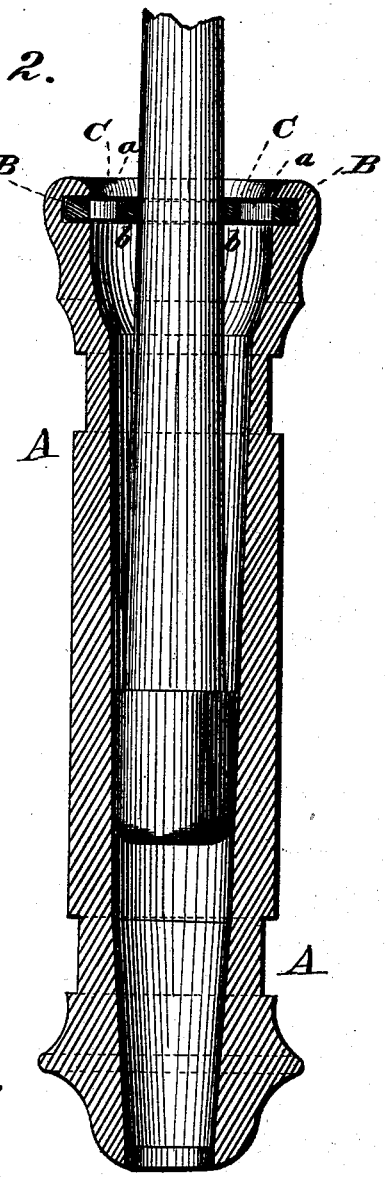
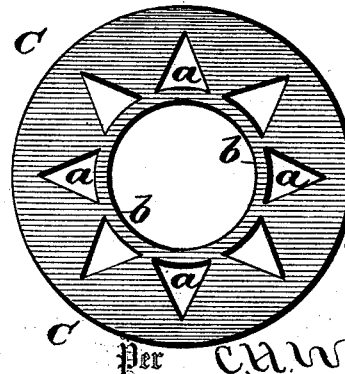

UNITED STATES PATENT OFFICE.

EDWIN CHAMBERLIN, OF LANSINGBURG, ASSIGNOR TO CHAMBERLIN & RANDALL, OF TROY, NEW YORK.

IMPROVEMENT IN WHIP-SOCKETS.

Specification forming part of Letters Patent No. 222,867, dated December 23, 1879; application filed November 18, 1879.

*To all whom it may concern:*

Be it known that I, EDWIN CHAMBERLIN, of Lansingburg, in the county of Rensselaer and State of New York, have invented certain new and useful Improvements in Diaphragms for Whip-Sockets; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to an improvement in diaphragms for whip-sockets, having for its object to render its operation more perfect; and it consists in the construction and arrangement of the same, as will be hereinafter more fully set forth, and pointed out by the claims.

In the annexed drawings, which fully illustrate my invention, Figure 1 is a side elevation, partly in section, showing the diaphragm in position. Fig. 2 is a central vertical section, and Fig. 3 is a detail view, of the diaphragm.

Like letters of reference indicate like parts.

A represents a whip-socket of any desired construction, having a groove, B, formed in its inner side near its mouth.

C represents the diaphragm, made preferably of rubber or other elastic material, having perforations $a$ just outside the inner surface, leaving a ring, $b$, in the center. This ring furnishes an even bearing all around the whip, and will hold it firmly in position, at the same time allowing the whip to be easily placed in or withdrawn from the socket.

My advantages over the plain rubber now in use are many. In using the plain rubber, the thickness of the same which is necessary to support it in a groove makes it very hard to pass the butt of the whip through its opening, and the stiffness wears on the whip, and also causes the whip to injure the rubber.

My device allows a rubber of sufficient thickness to be used. It furnishes an even bearing around the whip, and at the same time allows the whip to be freely placed in and removed from the socket, and holds it firmly in position.

Also, by this invention, the rubber expands to admit a large-butt whip without danger of pulling the rubber out of the groove. It holds the butt firm, whether large or small, and causes the whip to be easily put in or pulled out by the expansion and contraction of the ring.

Having thus fully described my invention, what I claim as new, and desire to secure by Letters Patent, is—

1. The perforated rubber diaphragm forming a ring on the inner surface of the rubber, the said perforations causing the ring to expand or diminish as the whip enters in or out of said rubber, as set forth.

2. A diaphragm for whip-sockets, provided with openings inside of its periphery and a continuous surface on its inner side, for the purpose set forth.

3. A diaphragm for whip-sockets, provided with the angular-shaped openings $a$ and the interior continuous surface, $b$, substantially as and for the purpose set forth.

In testimony that I claim the foregoing as my own I have hereto affixed my signature in presence of two witnesses.

EDWIN CHAMBERLIN.

Witnesses:
 C. N. WEBB,
 A. C. DICKINSON.